(12) United States Patent
Sakr et al.

(10) Patent No.: US 12,142,045 B1
(45) Date of Patent: Nov. 12, 2024

(54) GENERATIVE EVENT SEQUENCE SIMULATOR WITH PROBABILITY ESTIMATION

(71) Applicant: Kero Gaming Inc., Miami, FL (US)

(72) Inventors: George Sakr, Ontario (CA); Tomash Devenishek, Miami, FL (US)

(73) Assignee: Kero Gaming Inc., Miami, FL (US)

( * ) Notice: Subject to any disclaimer, the term of this patent is extended or adjusted under 35 U.S.C. 154(b) by 0 days.

(21) Appl. No.: 18/778,762

(22) Filed: Jul. 19, 2024

Related U.S. Application Data

(60) Provisional application No. 63/527,720, filed on Jul. 19, 2023.

(51) Int. Cl.
*G06F 40/284* (2020.01)
*G06F 40/40* (2020.01)
*G06V 20/40* (2022.01)

(52) U.S. Cl.
CPC ............ *G06V 20/44* (2022.01); *G06F 40/284* (2020.01); *G06F 40/40* (2020.01); *G06V 20/42* (2022.01)

(58) Field of Classification Search
CPC ...... G06V 20/44; G06V 20/42; G06F 40/284; G06F 40/40
USPC ........................................................ 382/155
See application file for complete search history.

(56) References Cited

U.S. PATENT DOCUMENTS

| | | | |
|---|---|---|---|
| 2013/0184039 A1 | 7/2013 | Steir et al. | |
| 2013/0324239 A1 | 12/2013 | Ur et al. | |
| 2014/0228112 A1 * | 8/2014 | Laakkonen | G11B 27/32 463/31 |
| 2016/0220906 A1 | 8/2016 | Umarov et al. | |
| 2017/0087474 A1 | 3/2017 | Moh et al. | |
| 2020/0276474 A1 | 9/2020 | Power et al. | |
| 2021/0073291 A1 * | 3/2021 | Hunter | G06F 8/33 |
| 2021/0142626 A1 | 5/2021 | Pillay et al. | |
| 2022/0108586 A1 | 4/2022 | Khosla | |
| 2022/0130207 A1 | 4/2022 | Huke et al. | |
| 2022/0148368 A1 | 5/2022 | Huke et al. | |
| 2022/0237988 A1 | 7/2022 | Asher et al. | |
| 2022/0270436 A1 | 8/2022 | Khosla | |
| 2022/0343723 A1 | 10/2022 | Huke et al. | |
| 2023/0005323 A1 | 1/2023 | Amaitis et al. | |
| 2023/0169766 A1 | 6/2023 | Ganguly et al. | |

(Continued)

OTHER PUBLICATIONS

Liu, Ziming, et al., "KAN: Kolmogorov-Arnold Networks," Jun. 16, 2024, arXiv:2404. 19756v4 [cs.LG], 50 pages.

(Continued)

*Primary Examiner* — Charlotte M Baker
(74) *Attorney, Agent, or Firm* — Pillsbury Winthrop Shaw Pittman LLP

(57) ABSTRACT

Provided is a tangible, non-transitory, machine-readable medium storing instructions that when executed by one or more processors effectuate operations comprising: obtaining, with a computing system, a generative transformer, the generative transformer trained to generate a predicted sequence of events; inputting, by the computer system, a first sequence of at least one event to the generative transformer; generating, with the generative transformer, a second sequence of at least one event subsequent to the first sequence of events based on the first sequence of at least one event; storing, with the computer system, the second sequence of at least one event in memory.

42 Claims, 6 Drawing Sheets

(56) References Cited

U.S. PATENT DOCUMENTS

| | | | |
|---|---|---|---|
| 2023/0244984 A1* | 8/2023 | Agrawal | G06N 20/00 706/12 |
| 2023/0260552 A1 | 8/2023 | Bose et al. | |
| 2023/0325424 A1 | 10/2023 | Kieser et al. | |
| 2024/0028925 A1* | 1/2024 | Kuduva | G06N 20/20 |
| 2024/0070485 A1* | 2/2024 | Weinberg | G06N 3/044 |
| 2024/0119606 A1 | 4/2024 | Javan Roshtkhari et al. | |
| 2024/0157978 A1* | 5/2024 | Wong | G06F 16/29 |
| 2024/0165484 A1 | 5/2024 | Ruiz et al. | |
| 2024/0205250 A1* | 6/2024 | Zarom | G06N 5/01 |

OTHER PUBLICATIONS

Kazemnejad, Amirhossein, et al., "The Impact of Positional Encoding on Length Generalization in Transformers," Nov. 6, 2023, arXiv:2305. 19466v2 [cs.CL], 37 pages.

Shaw, Peter et al., "Self-Attention with Relative Position Representations," Apr. 12, 2018, arXiv:1803.02155v2 [cs.CL], 5 pages.

Vaswani, Ashish, et al., "Attention is All You Need," Aug. 2, 2023, arXiv:1706.03762v7 [cs.CL], 15 pages.

Elfwing, Stefan, et al., "Sigmoid-Weighted Linear Units for Neural Network Function Approximation in Reinforcement Learning," Nov. 2, 2017, arXiv:1702.03118v3 [cs.LG], 18 pages.

Huang, Wei et al., "How Good are Low-bit Quantized Llama3 Models? An Empirical Study," Apr. 22, 2024, arXiv:2404.14047v1 [cs.LG], 7 pages.

Ferrall, Christopher, et al., "A Sequential Game Model of Sports Championship Series: Theory and Estimation," in Review of Economics and Statistics, Nov. 1999, DOI: 10.1162/003465399558427, https://www.researchgate.net/publication/24095618, 36 pages.

Kuo Ph.D., Chris, "Lag-Llama for Time Series Forecasting," from Modern Time Series Forecasting Techniques: For Predictive Analytics and Anomaly Detection, 1st Edition, Apr. 2024, ISBN 979-8-9907810-0-9, 11 pages.

* cited by examiner

GENERATIVE EVENT SEQUENCE SIMULATOR WITH PROBABILITY ESTIMATION

CROSS-REFERENCE TO RELATED APPLICATIONS

The present application claims the benefit of the following provisional patent application: U.S. Provisional Patent Application 63/527,720, titled GENERATING FULL SPORTS MATCHES USING GENERATIVE SPORTING EVENT SIMULATOR, filed 19 Jul. 2023. The entire content of each afore-mentioned patent filing is hereby incorporated by reference.

BACKGROUND

1. Field

The present disclosure relates generally to computing, calculating, or counting, and more specifically to computing arrangements based on specific computational models.

2. Description of the Related Art

In recent years, natural language processing techniques, particularly those based on generative pre-trained transformers (GPTs), have made significant strides in text generation tasks. These transformers may be trained on large dictionaries, such as the substantially the entire vocabulary of the English (or another) language, for generative tasks. Once trained, these transformers may generate text (or other outputs), such as for sentence completion tasks, chatbot (i.e., customer service) tasks, summation tasks, etc., based on various inputs including based on a prompt. GPTs may have a parallelized architecture that may significantly speed up generative tasks, such as with respect to a sequential architecture of a long short-term memory (LSTM) model, which may make these types of transformers appealing for further predictive and/or generative tasks. The discussion of trade-offs among various classes of models, or with respect to other topics herein, should not be read to imply any disavowal or disclaimer of claim scope.

SUMMARY

The following is a non-exhaustive listing of some aspects of the present techniques. These and other aspects are described in the following disclosure.

In an embodiment, there is provided a tangible, non-transitory, machine-readable medium storing instructions that when executed by one or more processors effectuate operations comprising: obtaining, with a computing system, a generative transformer, the generative transformer trained to generate a predicted sequence of events; inputting, by the computer system, a first sequence of at least one event to the generative transformer; generating, with the generative transformer, a second sequence of at least one event subsequent to the first sequence of events based on the first sequence of at least one event; and storing, with the computer system, the second sequence of at least one event in memory.

Some embodiments include a process to execute the above operations and a computer system in which the above operations are executed.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
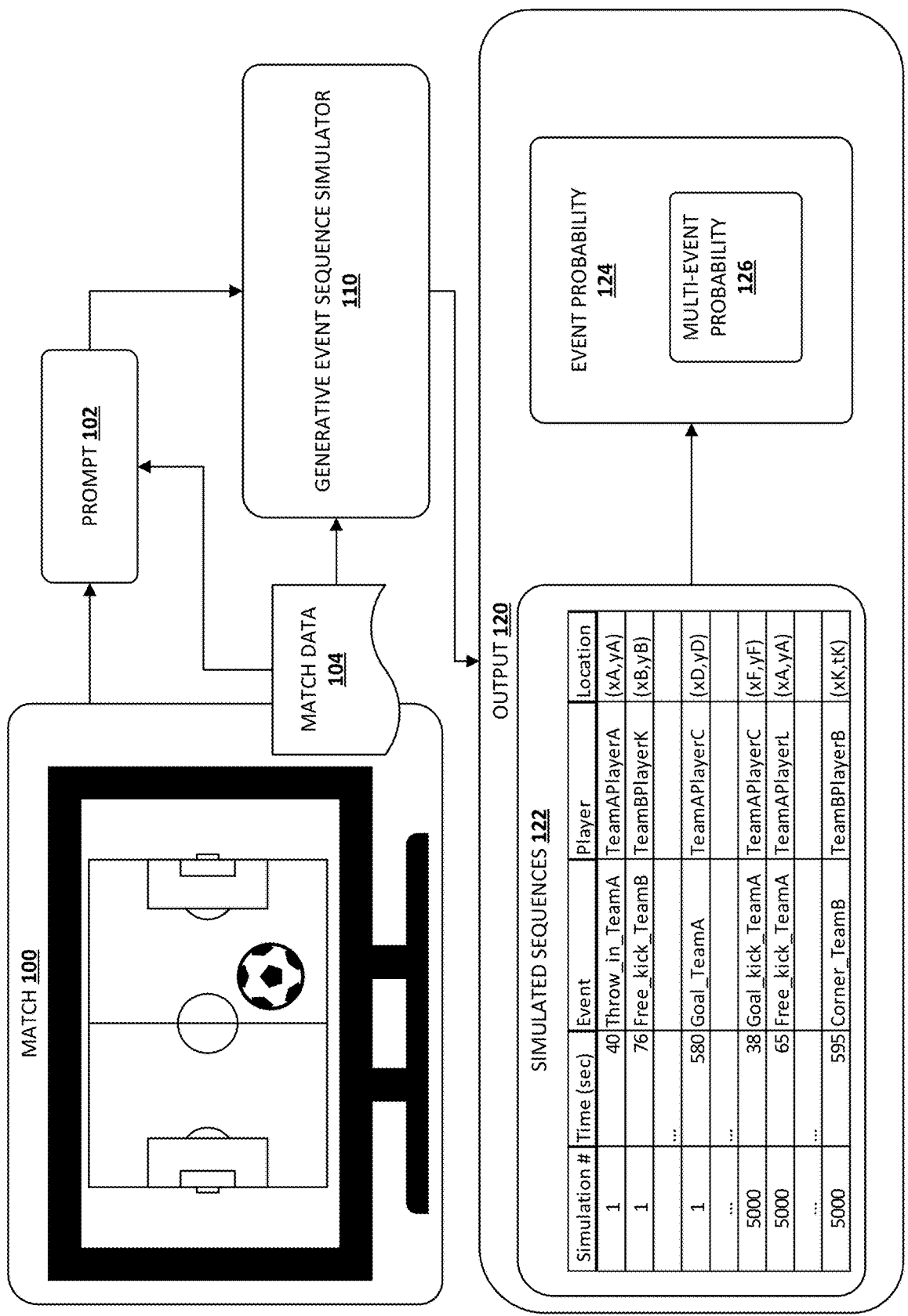
FIG. 1 depicts operation of an example generative event sequence simulator, in accordance with one or more embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the time-series forecasting. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Many transformer models are not well suited for time-series forecasting of certain types of events, particularly those that unfold in different physical locations of a region of physical space. Examples include weather forecasting, crime forecasting, predicting (e.g., setting odds on) events in sporting matches, predicting maintenance on industrial process equipment, predicting forest fire risk, and the like. In these and other examples, a stochastic process unfolds in time over a region of physical space in which the physical location of events can affect the likelihood of subsequent events. A fire started in a narrow strip of road between a lake and a highway is less likely to spread than one in a larger region of dry vegetation, for example, or a star basketball player with the ball in the paint is more likely to score than when at the half-court line, for instance.

Many transformer models, however, do not have a concept of physical location. Rather such models only encode the sequence of tokens typically in natural language text, with no notion of variable distance between adjacent items in the sequence. As such, these models tend to be less accurate and less suitable for time series forecasting of processes that unfold in physical space and have a stochastic element. This discussion of issues with many transformer architectures should not be taken as a disclaimer of those architectures or disavowals of the same, nor should it be taken to imply that all embodiments must address these issues or that any other feature described herein is required in all cases.

In some embodiments, a generative pre-trained transformer (GPT) model has been trained to operate in the domain of event prediction. For example, in some embodiments, a GPT model has been applied to the domain of sequential event generation in sports matches, although other sequential event generations are also contemplated. In some embodiments, a generative event sequence simulator (GESS) (which may also be referred to in specific embodiments as a Generative Sporting Event Simulator (GSES)) may be trained on a dataset of historical event sequences (i.e., historical match data). The model may be capable of generating full event sequences for events of limited time duration, such as for full sports matches, by sequentially producing events. For example, in embodiments focused on soccer, the GESS may generate a sequence of events such as goal kicks, corner kicks, goals, fouls, and other crucial moments. In some embodiments, the GESS may further identify actors (e.g., players, teams, etc.), and/or physical locations (e.g., field position, corner, etc. of one or more player or team member, locations of a ball, puck, etc.) associated with events of the sequence. In some embodiments, the model may be capable of generating specific types of event sequences (i.e., event sequences of specific length, number of event sequences, etc.) based on input prompts. In some embodiments, the GESS may be capable of generating multiple event sequences upon which probability of various event occurrences (including multi-event occurrences) may be determined.

In some embodiments, the GESS model system may leverage the inherent sequential nature of certain events, such as sports matches, to ensure coherence and realistic progression. By conditioning the model on past events—where the sequential nature of such events is preserved during training—the GESS model may be trained to predict event sequences based on the dynamics and strategies employed by actors (i.e., players, coaches, drivers, teams, etc.), which may allow it to generate plausible (i.e., realistic) event sequences, which may result in more engaging generated matches, more accurate predictions, etc. In some embodiments, a training dataset may be made of annotated matches, which may include detailed event sequences and contextual information for the type of event sequence to be predicted, which may enable the GESS model to learn intricate patterns and event dynamics—i.e., game dynamics.

FIG. 1 depicts operation of an example generative event sequence simulator (GESS) 110. The GESS 110 is a pre-trained sequence-of-events generator. The GESS 110 may be trained by any appropriate manner, such as those described herein. The GESS 110 may operate on input, which may be a first sequence of events or other sequence information, to generate a second sequence of events or other sequence output information. In some embodiments, the GESS 110 may be trained to predict events in a sequence containing one or more of the following: events in a sporting match, weather events, crop yield events, crowd behavior events, forest fire events, crime events, material deformation or failure events, corrosion or oxidation events on metal surfaces, and maintenance events in industrial process equipment The GESS 110 operates on various inputs, including match data 104 and a prompt 102, which may correspond to a match 100. The match 100 may be any appropriate match (e.g., contest), such as a soccer match, tennis match, etc. The match 100 may instead be another type of contest, such as a car race, poker game, etc. which is not typically described as a match but in which there are events and one or more competitors. The match 100 may be an event (e.g., a sequence of sub-events) which is not a contest, such as a task for driving a car from point A to point B. The match 100 depicted in FIG. 1 is a soccer match.

The match 100 (or other event) may be described by the match data 104. The match data 104 may be any appropriate data. The match data 104 may be sequential data. The match data 104 may include information about pre-match conditions (e.g., players, managers, venue, etc.). The match data 104 may be text, numerical, or a combination of multiple types of data. The match data 104 may be generated by a match processing program, which may be a computer vision model or any other appropriate model or program. The match data 104 may include positional information about events of the match. For example, the match data 104 may include information about where on the field a penalty kick took place. The match data 104 may include information about one or more actors associated with an event, such as the player to take the penalty kick, the goal at whom the penalty kick is taken, etc. The match data 104 may include non-event data in a sequence. For example, if the match starts at time zero (0), the match data 104 may include the positions of players at time 5 seconds, even though no specific event is recorded for that time. The match data 104 may include occurrences of events selected from a list of tracked events (e.g., a list of events which are identified or pre-determined to be significant for the match, such as events which may be bet on). The list of tracked events may differ based on the type of match occurring.

The GESS 110 may receive as input a prompt 102, which may cause the GESS 110 to generate one or more output 120. The prompt 102 may or may not include the match data 104. In some embodiments, the match data 104 may be included (appended, otherwise concatenated, etc.) with the prompt 102. In some embodiments, the match data 104 may be input into the GESS 110 separately from the prompt, such as through another portion of a user interface. The prompt 102 may be a text prompt, such as "Generate 5000 simulations of a match between Team A and Team B). The prompt 102 may be received through a user interface, in which options may be selected, such as the identity of Team A, the identity of Team B, the number of requested simulations, the time length of requested simulations, probability of event A, etc. The prompt 102 may be formulated by a user interface, in which a user selects various inputs and the GESS 110 or a program in communication with it generates a textual prompt based on the user's selections. The prompt 102 may be any appropriate prompt.

The GESS 110 may be any appropriate generative event sequence simulation, such as those described by various embodiments herein. The GESS 110 may output one or more output 120 based on the prompt 102 (and the match data 104). The output 120 may be configured based on the prompt 102. In FIG. 1, the output 120 is depicted as containing simulated sequences 122. The number and length of simulated sequences 122 output by the GESS 110 may be configured by the prompt. The simulated sequences 122 may include information about various events predicted to occur in the match based on parameters outlined in the prompt 102, given the match data 104. The simulated sequences 122 may be output in any appropriate format, such as in a chart (e.g., as depicted), in text format, in numerical (e.g., tokenized) form, etc. The simulated sequences 122 may contain sequence identification information (e.g., sequence 1, sequence 2, etc.), and information about events predicted to occur in the given sequence. The events may be events from the list of tracked events (e.g., those types of events which are also included in the match data 104). The events may include events from the list of tracked events which do not occur in the match data 104. That is, if the match has just started, the events of the simulated sequences 122 are likely to not have already occurred in the match data 104 of a currently occurring match. The events are not limited to those events which have already occurred or are common, but may include any events from the list of tracked events. The events may also include information about a team associated with the event, a player associated with the event, a location of the event, etc. In some embodiments, the event itself may be identified with a team (or player). That is, a first event may be Throw_in_TeamA while a different event is Throw_in_TeamB. In some embodiments, a type of event may be identified (e.g., Throw_in), and that event may be modified by a team identification, player identification, etc. The events may be tagged with or include a physical location, such as a location on the playing pitch. In some embodiments, the location of the event may also include information about the physical locations of players (in some embodiments, even including players not directly involved in the event itself) on the pitch. For example, in some embodiments, player location for all active players may be included at for each data point.

Based on the simulated sequences 122, the GESS 110 or any other model may determine one or more event probability 124. The event probability 124 may be determined in any appropriate manner, as described herein. The event probability 124 may be the probability for any appropriate event or class or events, such as a goal, a goal in the next 5 minutes, a goal by Team A, etc. The event probability 124 may be determined by calculating the number of occurrences of the given event in the simulated sequences 122. The event probability 124 may be determined by determining a probability distribution based on the simulated sequences 122. The event probability 124 may be used to determine odds, including betting odds. In some embodiments, the event probability 124 may be used to determine risk, actuarial data, etc. In some embodiments, the event probability 124 may be one or more of the following: events in a sporting match, weather events, crop yield events, crowd behavior events, forest fire events, crime events, material deformation or failure events, corrosion or oxidation events on metal surfaces, and maintenance events in industrial process equipment. In some embodiments, one or more multi-event probability 126 may be determined. The multi-event probability 126 may be determined for two or more events, which may be independent events, dependent events, etc. The multi-event probability 126 may be determined based on the event probability 124 for each of the events (e.g., mathematically) or based on the simulated sequences 122, such as by determining the number of simulated sequences 122 in which all events of the multi-event probability 126 occur versus the total number of simulated sequences 122. The multi-event probability 126 may or may not account for an order of the events. For example, if event A occurs before event B, this may count as an occurrence of the multi-event, while if event B occurs before event A, this may not count as an occurrence of the multi-event. In some embodiments, the event probability 124 and/or the multi-event probability 126 may be used to determine odds, betting lines, etc. In some embodiments, this determination may be done by the GESS 110. In some embodiments, determination of odds may be done based on the probabilistic output of the GESS 110.

The present techniques may be described in detail with reference to sports matches, but contemplated embodiments extend into other use cases. Examples include sports seasons or tournaments, board game or card-game matches or other iterated games, self-driving and augmented automobile applications, and other processes that unfold over time with a stochastic element and involving human agency. Similarly, examples are described with reference to GPT models, but other sequence-to-sequence models may be used, including any appropriate transformer architecture, hidden Markov models, dynamic Bayesian networks, XGBoost, long-short term memory models (LSTM), recurrent neural networks, and reinforcement learning models. Examples are also described with reference to both encoders and decoders, but may be encoder only, decoder only, have a larger encoder than decoder, etc.

In some embodiments, the architecture and training methodology of the GESS model may incorporate positional encodings and/or positional embeddings, attention mechanisms, and transformer layers. In some embodiments, the effectiveness of the generated event sequences may be determined by quantitative and/or qualitative measures. Quantitatively, statistical metrics such as event frequency and Bayesian distribution may be analyzed. Qualitative evaluations may involve expert opinions and user feedback on the generated matches' realism, including embodiments in which human feedback reinforcement learning (HFRL) may be used.

For some embodiments, results (for example, on modeling of event sequences in the game of soccer) demonstrate that the proposed simulator produces event sequences (e.g., sports matches) that exhibit realistic event sequences (e.g., realistic gameplay sequences), strategic decision-making, and event dynamics (e.g., match dynamics) comparable to real-world matches.

In some embodiments, the GESS model presents possibilities for various applications, including training simulations and events odds computation for betting purposes. By enabling the generation of complete sequences of events for duration-limited events (e.g., for complete matches), the event-driven GESS may provide a valuable tool for sports betting operators to unlock previously impossible new ways to create betting odds on match events. In other embodiments, the event-driven GESS may improve event simulation, including for sports video games. In yet other embodiments, the event-driven GESS may improve path control, where events may be correlated to travel paths or location, such as for self-driving cars, for train scheduling, or even turbulence prediction for airplane travel.

Probability Computation

In some embodiments, a GESS model may be leveraged to compute odds for the likelihood of events, including a likelihood of sequential multiple (independent or dependent) events, such as events of a sports match. In a specific embodiment, the generated sequence of events (e.g., matches) may capture realistic gameplay sequences, which include various events, which may be determined during training, such as goal kicks, corner kicks, goals, and fouls in soccer. These events may be events of a closed set, such as a set of tracked events (e.g., events identified as relevant) for a given type of match or other duration-limited event. By analyzing the generated sequences of events (e.g., matches) and extracting relevant statistics from the event sequences, it may be possible, in some embodiments, to estimate the probabilities and compute odds (e.g., probabilities) for specific events.

Based on computed probabilities (e.g., odds), the model-generated matches may be used to extract valuable insights about possible event sequences, such as predicted team performance metrics, scoring patterns, player statistics, match dynamics, etc. These insights may then be analyzed and combined with other relevant factors, such as historical data, team form, player injuries, and weather conditions, to determine the probabilities of specific events occurring during a sequence of events (e.g., a real match). In some embodiments, relevant factors, such as actor identity, coach identity, weather, etc., may be input into the GESS model itself, such as through the use of a prompt or input event data (e.g., data corresponding to a sequence of events that has already occurred).

In some embodiments, a probability (e.g., odds) computation process may involve statistical analysis, additional machine learning techniques, and domain expertise to ensure accurate and reliable predictions. In some embodiments, by utilizing the GESS model, based on GPTs, as a foundation, researchers and data analysts may enhance their probability computation methods and provide valuable insights to bookmakers, bettors, and sports analysts. In some embodiments, by utilizing the GESS model as a foundation, software developers may increase the realism (and therefore success) of virtual matches, such as in esports and other video games. In some embodiments, by utilizing the GESS model as a foundation, security professionals may increase the safety of crowd control, vehicle travel, etc. Improved prediction for sequential events may provide other, non-enumerated, obvious, and non-obvious benefits for event management and other applications.

While the GESS model may provide a simulated event sequence (e.g., sports match, travel path, etc.) with realistic event sequences, the accuracy of the predicted events and event probability may rely on the quality and representativeness of the training data and/or prompt, as well as additional factors considered in the probability computation process.

Example Use Case

For some events, such as sports matches, the likelihood of a future event occurring may be highly dependent on the occurrence of other previous events. Therefore, in some embodiments, knowledge of events which have already occurred in a match or other limited duration event may improve prediction of subsequent events. For example, in in-play betting, payout calculations may shift quickly based on events which have occurred, which may show general play favoring one team and/or an actor, or other event trends. In-play betting, also known as live betting, may be placing bets on an event, such as a sporting event, while it is happening. This type of betting may allow bettors to place various types of wagers after the event has started, which may take into account the live action and changing circumstances of the game.

Example from Soccer

Now a specific example of application of GESS to a soccer match, with live calculation of event (and multi-event) probability is described. In the given example, there is a soccer match between Team A and Team B. The game has already started, and it is currently the 30th minute with the score tied at 1-1. During the match, an example bettor may place several types of in-play bets, including:

Next Team to Score: Betting on whether Team A or Team B will score the next goal.

Match Result: Betting on which team will win the match or if it will end in a draw, taking into account the current score and time remaining.

Total Goals: Betting on the total number of goals that will be scored by the end of the match, such as over/under a specific number (e.g., over 2.5 goals).

Next Goal Scorer: Betting on which player will score the next goal.

Number of Corners: Betting on how many corners will be taken by either team for the remainder of the match.

This type of betting may be appealing to a bettor, such as a bettor who is highly engaged in the match and believes they may have an advantage over the current line. For example, if during the match, a bettor believes that Team A is dominating possession and creating many scoring chances, he may place an in-play bet on Team A to score the next goal, believing their strong performance will lead to another goal soon. The calculation of in-play betting probabilities, and improvements thereof, is therefore of use to those who maintain sports odds, enable bet placement, or otherwise engage with bettors. In other embodiments, the calculation of in-play probabilities and improvements thereof may allow for greater viewer engagement, such as by displaying or reading relevant statistics (for example, as augmented reality, by a sportscaster, etc.) over sports broadcasts. In other embodiments, the calculation of in-play probabilities and improvements thereof may allow for better crowd control, especially for closely contested and highly volatile soccer matches with thousands of attendees.

In some embodiments, the GESS model may learn from historical data to generate matches (e.g., matches, partial matches, etc.) between Team A and Team B. In some embodiments, as the match progresses, the GESS model may generate the remaining minutes of that match GIVEN what has already happened. Having generated a list of remaining events (e.g., a sequence of events), the process may be repeated N times, and then the probability of a given event occurring (for example, the event of any of the above-mentioned in-play bets) may be computed. For example, if 60% of the N generated simulations finish with Team A winning, it may be determined that that Team A will win with a probability of 60%, or if 50% of the simulated matches finished with more than 2.5 goals, it may be determined that the over probability is 50% for 2.5 goals.

The GESS model may also be very useful in computing parlay odds or even dependent or subsequent event odds. For example, the probability of Team A winning and Player P scoring 2 goals and Team B not scoring any goals, may be determined by finding the percentage of time that those events happened in a given N simulations of that match and deduce the odds. Further, the odds that a second event happens given a first event happens, may also be determined, such as the odds that Player C scores a goal and then Player K scores a goal, versus the odds that these independent events occur in a different order. Likewise, the odds that a first event results in a second event may be determined for dependent or independent events, such as given that any player from Team A scores, how likely is it that a yellow card is issued to Team B in the next 100 seconds.

Architecture and Training

The GESS may have architecture and training designed to generate sequential events, including full (or partial) matches. In some embodiments, the GESS may be a simulator designed to capture the sequential nature of events, including sporting events, and learn patterns and dynamics from a large-scale annotated dataset. The architecture may incorporate positional encodings and/or positional embeddings, attention mechanisms, and transformer layers to enable effective generation or one or more events.

Model Architecture

In some embodiments, the GESS architecture may be specifically tailored to capture the dynamics and dependencies of duration-limited event sequences, such as sports match events, which may occur between a limited number of actors and over a limited physical distance. The architecture may have several key components:

Positional Embeddings: In order to encode the spatial information corresponding to events, the model may incorporate positional embeddings. In some embodiments, the model may instead or additionally incorporate positional encodings. In some embodiments, these positional embeddings may capture the relative positions of events as they happen during a match, facilitating the model's understanding of events and strategic movements. In some embodiments, the positional embeddings may capture the relative positions of actors (e.g., players), or a game object, such as a soccer ball, hockey puck, etc., during the game. In other embodiments, positional embeddings may correspond to the relative position of objects surrounding an actor, such as animate and inanimate objects surrounding a car in a self-driving application. The positional embeddings may be generated based on data collection from previous events (including historical events, events which have already occurred in a match, etc.). While referred to as positional embeddings herein, these may instead or additionally be positional encodings.

1-Data Collection: in the soccer example, data on player and ball positions for each moment in the match may be gathered. In some embodiments, this may be gathered from a telecast, cameras, telemetry (including Lidar), etc. which capture player and ball movement in real time. For example, this type of data may be available, such as by purchase from data providers such as Opta, IMG ARENA, etc. This data may be the x and y coordinates of each player and the ball on the field. In some embodiments, this data may include x, y, and z (or height) coordinates of each player and ball on the field. The data may have any appropriate frequency or refresh rate, such as per 1 second, per 50 milliseconds, etc. In other examples, position data may be likewise gathered, such as tennis player and ball position, car and surrounding object position and relative velocity. In some embodiments, positional embedding may include velocity embedding, or velocity, telemetry, acceleration, etc. may be inferred from positional embeddings, which change over time in response to movement. In some embodiments, positional embeddings may be determined based on positions determined by another model, such as a computer vision model. In some embodiments, an upstream computer vision model may be part of or in communication with the GESS model.

2-Data Normalization: in some embodiments, such as the soccer example, the positions of the players and the ball (or other objects) may be normalized to ensure they are within a consistent range. For example, the positions may be normalized to the interval [−1, 1] based on the dimensions of the soccer field which is provided in the data. In some embodiments, such as for a vertical or height example, the position may be normalized to a ceiling and/or floor, with heights taller than the ceiling (or lower than the floor) being truncated or normalized to the end of the interval.

3-Positional Embedding Creation: embeddings for the positions may be generated using different techniques. Any appropriate positional embeddings may be used, including absolute positional embeddings. In some embodiments, sinusoidal embedding may be preferred.

The positional embeddings may help provide, to the GESS model, multiple types of predictive information, for example, in the soccer example (and by extension to other sporting and non-sporting applications):

A. Game State Representation: positional embeddings may be used to represent the state of the game (or world) at each timestep.

B. Trajectory Prediction: positional embeddings and the difference between positional embeddings may provide information about velocity, trajectory, etc. and therefore about future positions of players and the ball (or other tracked objects) based on current embeddings.

C. Strategy/Behavior Analysis: team strategies and actor behavior may be analyzed by comparing embeddings over time. For example, one manager may deploy players deep into the other team's territory, while another manager may play more defensively. This may be reflected in positional embeddings over the events of a match with each of the coaches. In some embodiments, positional embeddings (for both input and output) may allow the GESS system to model each team's playing style under different managers and conditions. In other embodiments, a driver's individual behavior style may be reflected in positional embeddings.

In some embodiments, the positional embeddings may have the same dimensions as other input to the GESS model (e.g., tokens). In some embodiments, to compute the embeddings, a total embedding dimension of d (which may be any appropriate dimension) may be selected. For example, for two-dimensional positions, assuming d is the total embedding dimension, and half of it (e.g., 0 to d/2) may be used for the x-coordinate and the other half (e.g., d/2 to d) for the y-coordinate. Then, in some embodiments, the positional embeddings may be given by $$PE_{x,2i} = \sin\left(x/1000^{\frac{2i}{d/2}}\right)$$

$$PE_{x,2i+1} = \cos\left(x/1000^{\frac{2i}{d/2}}\right)$$

$$PE_{y,2i} = \sin\left(y/1000^{\frac{2i}{d/2}}\right)$$

$$PE_{x,2i+1} = \cos\left(y/1000^{\frac{2i}{d/2}}\right)$$

The final positional embedding for (x,y) may then obtained by concatenating $PE_{x,2i}$, $PE_{x,2i+1}$, $PE_{y,2i}$ and $PE_{y,2i+1}$ over each dimension, to give:

$$PE(x,y)=[PE_{x,0},PE_{x,1},\ldots,PE_{x,d/2},PE_{y,0}, PE_{y,1},\ldots,PE_{y,d/2}]$$

For positional embeddings corresponding to three dimensions (e.g., x, y, and z) the total number of dimensions may be divided in thirds and analogous embeddings used.

In some embodiments, the positional embedding may correspond to the physical location of an event (e.g., of an input event). In some embodiments, positional embeddings corresponding to physical locations of some or all actors (e.g., players), objects of game play (e.g., the ball), and other locations may also be input, including in concatenated form. In some embodiments, positional embeddings may also be used to relate events of an input sequence to one another.

Figure 2:
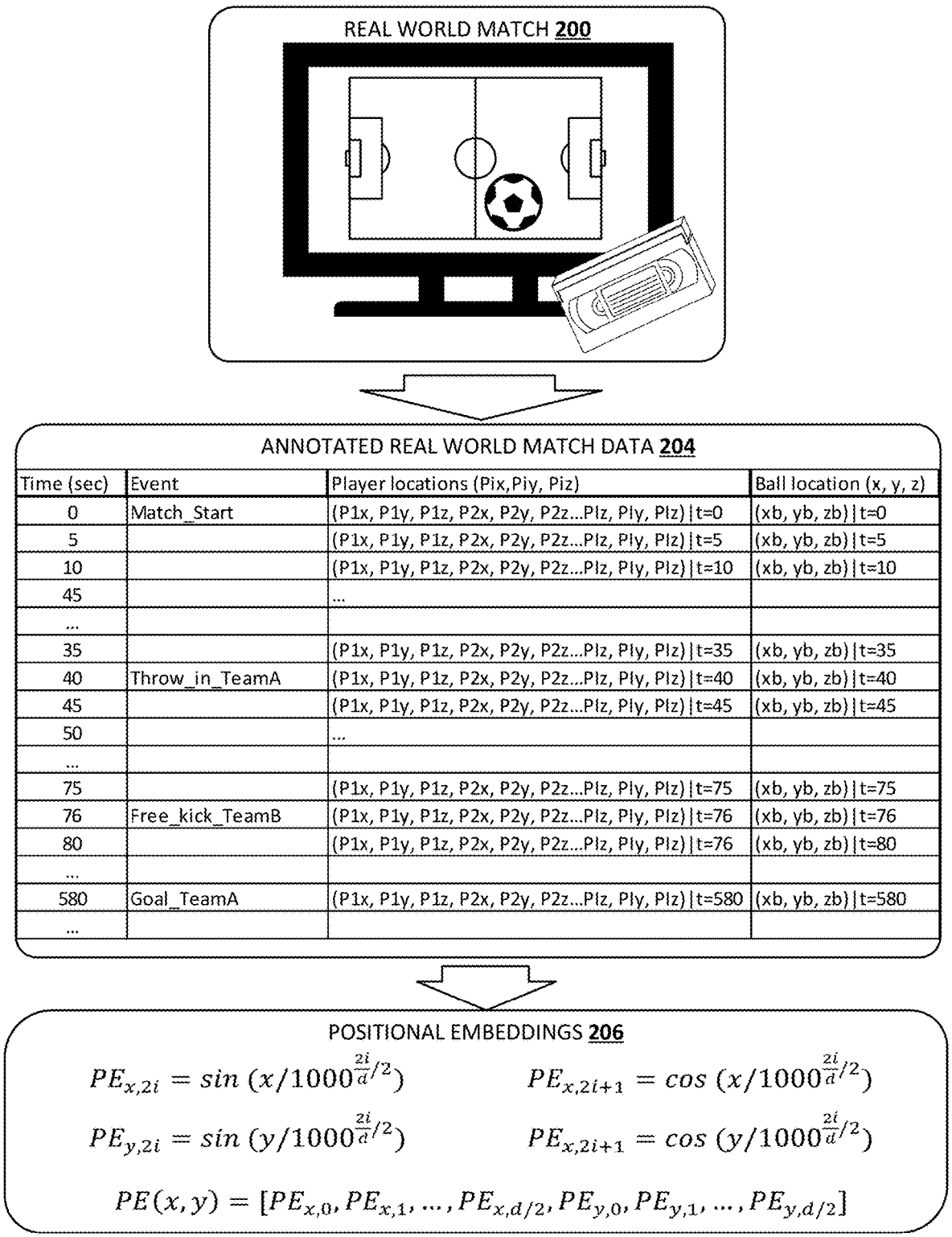
FIG. 2 depicts some example inputs for a generative event sequence simulator, in accordance with one or more embodiments.

FIG. 2 depicts some example inputs for a generative event sequence simulator. A real world match 200 is used to generate a set of annotated real world match data 204. In some embodiments, the real world match 200 may be a historical (e.g., already completed) match. In some embodiments, the real world match 200 may be a currently occurring match. In some embodiments, the real world match 200 may be an artificially generated match, such as a match generated during an esport sports game (for example, a video game, an arcade game, etc.). In some embodiments, the real world match 200 may be taped or otherwise recorded. In some embodiments, match data (e.g., annotated real world match data 204 or any other appropriate match data) may be recorded during the playing of the real world match 200. In some embodiments, match data (e.g., annotated real world match data 204 or any other appropriate match data) may be extracted from a recording of the playing of the real world match 200. The events, statistics, player positions, etc. associated with the real world match 200 may be saved into one or more files, such as text files, numerical files, etc. The events of the real world match 200 may be tagged with information about the event, such as time of occurrence, physical location, etc.

From the real world match 200, a set of annotated real world match data 204 may be generated. In some embodiments, the real world match 200 may be processed automatically, by the GESS or another model (for example), to extract the annotated real world match data 204. In some embodiments, multiple sources of data may be combined to generate the annotated real world match data 204. The annotated real world match data 204, although depicted in a chart, may have any appropriate format, such as text, tab delimited data, etc. The annotated real world match data 204 may contain events which occurred in the real world match 200 and the order in which they occurred in. In some embodiments, the events of the annotated real world match data 204 may be listed in order. In some embodiments, the events of the annotated real world match data 204 may be tagged or otherwise associated with a time of occurrence (such as relative to the start of the real world match 200). In some embodiments, the events of the annotated real world match data 204 may further include positional information about the event, about players when the event occurred, about a game object (such as a soccer ball), etc. The positional information may be part of the annotated real world match data 204. In some embodiments, the positional information may be related to the annotated real world match data 204, but may not be found in the same file or dataset. In some embodiments, the positional information may contain information about all players. In some embodiments, the positional information associated with an event may contain information about the event itself, only players involved in the event, only the ball, etc. In some embodiments, the annotated real world match data 204 may contain only events—that is may, not contain information about match times when no event from a list of tracked events occurs. In some embodiments, the annotated real world match data 204 may contain null events—that is, data points which do not correspond to any event from the list of tracked events but where nevertheless positional information is recorded. In some embodiments, the annotated real world match data 204 may contain entries for a time interval, such as recorded every 50 milliseconds, every 1 second, etc. In some embodiments, the annotated real world match data 204 may contain entries triggered by events themselves, e.g., occurrences when an event of the list of tracked events occurs, events recorded if the player position changes by more than a threshold, etc.

In some embodiments, positional information is transformed into positional embeddings 206. The positional embeddings may be sinusoidal embeddings or any other appropriate positional embedding as previously described. The positional embeddings may be embeddings corresponding to the position of the ball, the position of one or more players, the position of the ball and the positions of all the players, etc. The positional embeddings may be determined for the events of the annotated real world match data 204. In some embodiments, the positional embeddings may be determined for null events or times that don't otherwise correspond to events of the list of tracked events.

Attention Mechanisms: In some embodiments, attention mechanisms may be used to capture dependencies between events and contextual information. By attending to relevant events and their surrounding context, the model may be able to more effectively generate coherent sequences of events. In some embodiments, multi-head attention mechanisms may enable the model to focus on different aspects of the event to be simulated (e.g., the match) simultaneously. In some embodiments, the same attention mechanism used in Llama3 may be used.

Transformer Layers: In some embodiments, transformer layers may be employed to facilitate information flow and capture long-range dependencies within the event sequences. Each transformer layer may consist of self-attention and feed-forward neural networks, which may allow the model to process and transform the sequential information effectively.

Figure 3:
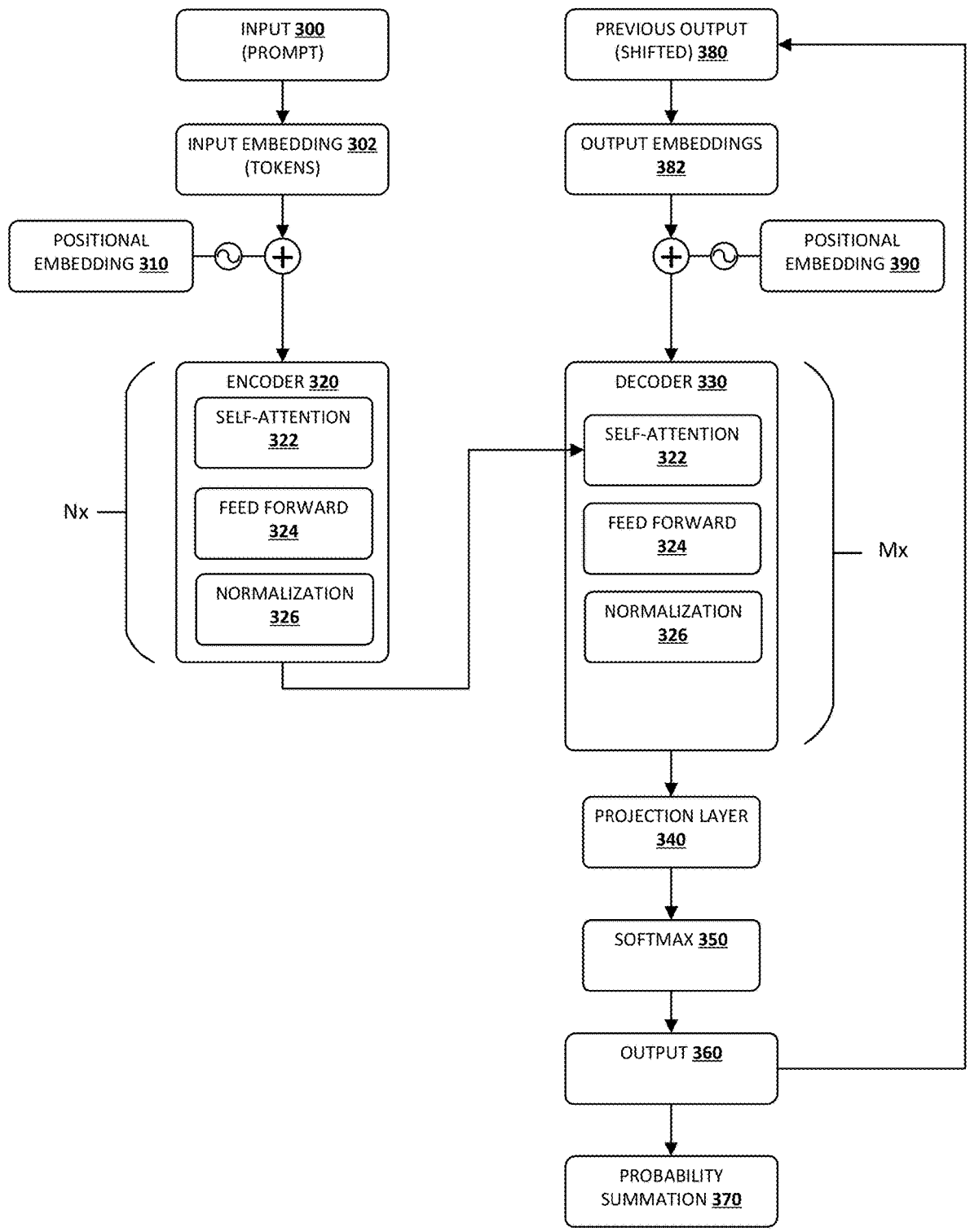
FIG. 3 depicts an example architecture for a generative event sequence simulator, in accordance with one or more embodiments.

FIG. 3 depicts an example architecture for a generative event sequence simulator. The GESS of FIG. 3 has a transformer architecture, in which input 300 (which may be a prompt) is fed into an input embedding layer 302, which may generate tokens based on the prompt. The tokens are then concatenated with positional embeddings 310, which may be any appropriate positional embeddings as previously described. This data is then processed by an encoder 320, containing self-attention 322, feed forward 324, and normalization 326 layers. These layers will be described in more detail later. The encoder 320 may contain N units of this transformer architecture. In order to generate a sequence, output of the encoder 320 is then fed into the decoder 330, which may contain M transformer units with self-attention 322, feed forward 324, and normalization 326 layers. Also fed into the decoder 330 may be previous output 380 (e.g., previously predicted events of the predicted sequence of events) of the GESS. The previous output 380 is also tokenized in the output embedding layer 382 and concatenated with positional embeddings 390. From the decoder 330, the data may be processed through a projection layer, an activation layer, such as a softmax activation layer 350, to generate output 360, which may be any appropriate output as previously discussed. A probability summation 370 operation may be performed on the output 360 to generate event probability, odds, risks, etc. While transformer architecture is described in detail herein, the GESS may instead be or include other types of sequence-to-sequence models, such as LSTM models, Kolmogorov-Arnold networks hidden Markov models, dynamic Bayesian networks, recurrent neural networks, and reinforcement learning models. In some embodiments, attention may additionally or instead be any other appropriate attention type, such as flash attention, grouped query attention, etc.

Transformer architecture, commonly used in large language models, represents a revolutionary approach that has significantly advanced natural language processing tasks. Transformers themselves are based on a self-attention mechanism, which may allow them to capture global dependencies which exist within an input sequence efficiently.

In a generic transformer, the architecture consists of two main components: encoder and the decoder. The encoder may take an input sequence and transform it into a sequence of contextualized representations (e.g., tokens), while the decoder may generate an output sequence based on the encoded input.

Unlike the traditional encoder-decoder architecture, which may rely on recurrent neural networks like LSTMs, transformers may eliminate the need for sequential processing of input. Instead, they may process the entire input sequence simultaneously by leveraging self-attention mechanisms. Self-attention allows each position in the input sequence to attend to all other positions, which may capture long-range dependencies more effectively. This parallelism may enable transformers to achieve higher efficiency and better capture dependencies across long distances (e.g., across long distances between elements of an input).

Compared to LSTMs, transformers may offer several advantages. Firstly, transformers may have a more parallelizable architecture, which may make them highly suitable for efficient training on modern hardware. In some embodiments, the GESS model still may have hardware demands which require processors with advanced processing power, such as Nvidia A100s, versus conventional ATX 490s, however their demands are anticipated to be lower than LSTMs processing the same amount of data. Additionally, transformers may mitigate the vanishing gradient problem often encountered in LSTMs, such as by employing residual connections and layer normalization, which may stabilize training and enable deeper architectures.

Furthermore, transformers may excel in capturing dependencies between distant elements in a sequence, which may make them better suited for tasks requiring global context understanding, such as machine translation or language generation. In contrast, LSTMs may be better at modeling local dependencies and sequential patterns.

Dataset Description

In some embodiments, the formatting of input and output data may allow more accurate operation of the GESS system.

In some embodiments, in contrast to text GPT models, the GESS model does not need to generate coherent text, but it is operated instead to generate a coherent sequence of events. The following comparisons show the difference between inputs and outputs of the GESS model optimized for a soccer match and ChatGPT. ChatGPT operates in the domain of texts (both as inputs and outputs), where the texts are made up of words. The GESS operates on sequences of events (again, both as inputs and outputs). In some embodiments, the GESS operates on matches (e.g., soccer matches) made up of events. ChatGPT predicts the next word or word(s) to generate coherent text. The GESS operates to predict the next event or event(s) in a coherent sequence of events. ChatGPT operates on texts which are made up of 1,000 words, on average, while the GESS operates on matches which are made up of 1,500 events, on average. ChatGPT operates on approximately the entire English Language consisting of about 300,000 words (or alternatively or additionally any other appropriate language). The GESS operates on a dictionary (e.g., understands tokens corresponding to) a more limited set of possible events for a multi-event sequence. For example, in some embodiments for the soccer example, the GESS may operate on a dictionary consisting of 23 different events per team (free kick, corner kick, goal, etc.). In some embodiments, the dictionary may be larger, such as consisting of more events, 23 different events per player, or even a more limited set of events. ChatGPT may return different responses for different prompts. That is, the prompt may determine the output of ChatGPT generation. ChatGPT may also return different responses for the same prompt, depending on a temperature parameter setting which may introduce stochasticity at various points within the model which is reflected in variable output. The GESS may return multiple responses (e.g., multiple predicted possible sequences of events) for the same prompt. In some embodiments, the GESS may output multiple sequences of events in response to a prompt requesting multiple sequences of events. The sequences of events output by the GESS may vary based on a stochastic input, such as controlled by a temperature parameter or any other appropriate layer or input, which may cause differences in output. The GESS may output multiple sequences in batches or in any other appropriate manner.

Usage Scenarios

The GESS may be used in different scenarios to generate different types of event sequence output. For example, in a first usage scenario, the GESS may receive a prompt such as "Generate 5000 simulations for the first 10 minutes of a match between Manchester City and Inter Milan". The GESS may or may not also receive information about previous events in a sequence of events (e.g., match events), such as if the match has not started yet there may be no events to receive. In some embodiments, information about the match (e.g., other than match events) may be conveyed in the prompt, such as "Generate 5000 simulations for the first 10 minutes of a match between Manchester City and Inter Milan given that Lautaro Martinez is playing injured". In some embodiments, pre-existing (e.g., pre-game) situations may be conveyed in event data (e.g., match data), such as for a time zero match event. The GESS may output the predicted sequence(s) of events in any appropriate format, such as in delimited data (e.g., a text file), in a chart or graph, as individual simulation outputs, as probabilities based on the set of predicted sequences of events, etc. The GESS may output data as previously described in reference to FIG. 1 (e.g., as output 120).

In another usage scenario, the GESS may receive a prompt such as "Generate 5000 simulations for the next 10 minutes of a match between Manchester City and Inter Milan given that the following list of events have already happened:" (further supplemented by a pasted list of events that happened during the match in order). In some embodiments, the events of the list may include times (e.g., event times, time stamps, etc.). In some embodiments, the events of the list may not include times, but may be ordered with respect to the order they occurred in. The GESS may output a predicted sequence of event(s) similar to that similar to that output for the previous scenario but with different events occurring, which take into consideration what has already happened in the match.

Model Architecture and Training Process

In some embodiments, the GESS neural network architecture may consist of multiple layers, each of which may serve a specific purpose in the model's computation. In some embodiments, the GESS architecture may include one or more of each of the following layers.

Input Embedding Layer:

In text-based GPT, the input layer may take the input as a tokenized sequence and map each token to a corresponding vector representation, known as a word embedding. The text-based GPT may also incorporate positional encodings to convey the sequential information of tokens within the input sequence. In comparison, the GESS architecture may still as input a tokenized input, such as the tokenized sequence of events of a sporting match, and maps each token to a corresponding vector representation, the event embedding (e.g., sport-event embedding). In addition, in some embodiments, the positional encoding of each of the players and the ball (or other appropriate positional embedding as previously discussed) may be concatenated with the previous sports-event embedding. This may yield a very rich representation of the events as well as their location on the field. This may also allow the attention mechanism to focus not (or not only) on the position of an event in a sequence but predominantly on its physical location (e.g., location on the field). In text, which is the domain of ChatGPT, the location of a word in a sentence is very important, while in a soccer match the location of an event on the field may be much more important than its location in the list of past events. In some embodiments, the positional embedding of each event provides the necessary ordinal context to the GESS model.

Transformer Encoder Layers:

In some embodiments, the GESS architecture may be primarily composed of transformer encoder layers.

In some embodiments, each transformer encoder layer may consist of one or more sub-layers that perform self-attention and feed-forward operations.

Self-Attention Sub-Layer:

In some embodiments, the self-attention mechanism may allow each position in the input sequence to attend to (e.g., be processed in relation to) all other positions, which may capture contextual relationships, in some cases more effectively than other models. The self-attention sub-layer may compute attention weights that determine the importance of different positions when encoding a specific token. The self-attention mechanism may be employed to process and encode the input sequence at different positions. In some embodiments, the temporal location of an event—as well as its (x,y) coordinates—may be incorporated into this layer. For example, the position of the event in the list of events (e.g., in the sequence of events input into the GESS model) may encode the temporal aspect of an event, i.e., if an event A is present before event B in the list, it means that event A happened before event B. In some embodiments, the positional embedding may add the spatial aspect of the game explicitly to the calculations.

Feed-Forward Sub-Layer:

In some embodiments, following the self-attention sub-layer, a feed-forward neural network may be applied, including independently, to each position's encoded representation. In some embodiments, the feed-forward sub-layer may introduce non-linear transformations to enhance the representation's expressive power. In some embodiments, the feed-forward layer may consist of fully connected layers with a Sigmoid Linear Unit (SiLU) or any other appropriate activation function.

Layer Normalization:

In some embodiments, layer normalization may be applied after each sub-layer in the transformer encoder layers.

Layer normalization may normalize the output of each sub-layer by subtracting the mean and dividing by the standard deviation across the feature dimensions.

In some embodiments, layer normalization may help in stabilizing the training process and improving the model's generalization ability.

In some embodiments, the GESS operates with sixteen transformer layers, however more or fewer transformer layers may be used. In some embodiments, a domain dictionary (such as a soccer match domain dictionary) may be much smaller than an English language text dictionary (e.g., only consisting of allowable soccer match events) and sequences may likewise be much smaller that the text sequences analyzed by ChatGPT. Which is not to say that the GESS model is limited to smaller domain dictionaries, as events may be described in more detail and finer shading which may expand the dictionary. For example, a corner kick may be described by the team who makes the corner kick, the player who makes the corner kick, the reason for the corner kick, the corner from which the kick is made, etc. In some embodiments, for dictionaries which are significantly large, further optimization methods may be used to improve generation time, such as beam search. In some embodiments, the base transformer architecture described in (Vaswani et al., 2017) may be used, together with the optimizations and changes discussed herein.

Output Projection Layer:

In some embodiments, the final layer of the GESS architecture may be an output projection layer.

The output projection layer may linearly project the encoded representations of each token to a multi-dimensional output space.

In some embodiments, the dimensionality of the output space may be typically equal to the vocabulary size (e.g., the size of the domain dictionary), which may allow the model to generate probabilities for each token in the vocabulary. In some embodiments, each event of the dictionary corresponds to one token. In some embodiments, events may correspond to multiple tokens, such as a token for an event and a token for an actor of the event, or any other appropriate tokenization.

Softmax Activation:

In some embodiments, the softmax activation, or any other appropriate activation or probability function, may be applied to the output of the projection layer.

In some embodiments, the softmax activation function may normalize the output values into a probability distribution, which may represent the likelihood of each token being the next token in the sequence.

In some embodiments, during both training and generation phases, the GESS architecture may process the input sequence through substantially the same number of transformer encoder layers, which may enable the model to capture contextual dependencies and generate coherent and contextually relevant outputs. The number of transformer encoder layers may vary depending on the model domain (e.g., soccer versus tennis or matches versus self-driving car paths), a tradeoff between accuracy and overtraining, or a number of other factors.

In some embodiments, the GESS model may be trained on a dataset comprising annotated matches. The dataset may include event sequences, contextual information, and match-specific details such as player attributes. The training process may follow at least some of the following steps:

Data Preprocessing: In some embodiments, the dataset may be preprocessed to extract event sequences and their associated contextual information. The dataset may be a video or other image-based dataset. In some embodiments, the dataset may be extracted from a computer vision model. In some embodiments, the dataset may be from a historical event (e.g., match) or a match in process. In some embodiments, the data may be from a simulation of a match, such as a video game in which a player can play one or more positions on a team A while a team B is played by a CPU or another player. In some embodiments, the dataset may be a text file, such as a tab delimited event summary. In some embodiments, the dataset may be a numerical data set, such as for player positions. In some embodiments, multiple datasets, such as a text file of events and a graphical file of player positions may be combined in preprocessing. In some embodiments, the events may be encoded into numerical representations (e.g., tokens), while player stats and contextual information (e.g., if available), such as team formations, manager identify, etc. may be transformed into embeddings (which may or may not be positional embeddings). In some embodiments, a first tokenization occurs by which the play-by-play data is tokenized into individual units (events). The dictionary of tokens may be domain dependent. In some embodiments, the dictionary of tokens may be the same across a domain. That is, the tokens available for a soccer match between Inter Milan and Manchester United may be the same tokens available for a soccer match between Brazil and Argentina. In other embodiments, the dictionary of tokens may be expanded to include player identify and other match specific information, in which case the domain dictionary may include tokens which are not used in a specific match (e.g., if a given player is not a participant) and which may be added and removed to the dictionary as the pool of possible players changes. In some embodiments, the dictionary may be expanded as necessary (e.g., to accommodate new players) without removal or less used tokens.

In some embodiments, special tokens may be added, such as in pre-processing, to separate events, indicating match start, extra time, halftime, match end, overtime events, etc. In some embodiments, these may include special tokens like <s> for the start of the sequence and <pad> for padding.

In some embodiments, the tokenized sequences may be divided into fixed-length sequences for efficient batch processing.

Model Initialization: In some embodiments, the GESS simulator may be initialized with random weights. The positional embeddings and transformer layers may be set up according to the architecture specifications. In some embodiments, such as for retraining, fine-tuning, transfer learning, etc., the GESS model may be initialized with previously determined weights and architecture.

Self-Supervised Training Iterations: In some embodiments, the GESS model may be trained by self-supervision. In some embodiments, self-supervision during training may be provided by an autoregressive language model (AR), trained to predict the next event in a sequence of events. The AR may be trained based on the same type of training data (e.g., historical matches) as the GESS model. The GESS model may provide benefits, such as during event probability calculations, of speed over the AR, which may be a sequential predictor. During training, the calculation rate difference between the AR and the GESS may not be important, as the GESS can be trained at a slower rate corresponding to AR sequence generation, while during deployment the GESS may provide more and more accurate results because of its parallel nature. In some embodiments, the training may be conducted in iterations, where a batch of event sequences is fed into the model(s). In some embodiments, the GESS model predicts the next event in the sequence, and the predicted event is compared with the ground truth event (which may be a historical event or an AR prediction) to compute the cross-entropy loss (although any appropriate loss or optimization function may be used). In some embodiments, backpropagation and gradient descent techniques may be employed to update the GESS model's parameters, which may minimize the loss and improve the model's event prediction capability.

Figure 4:
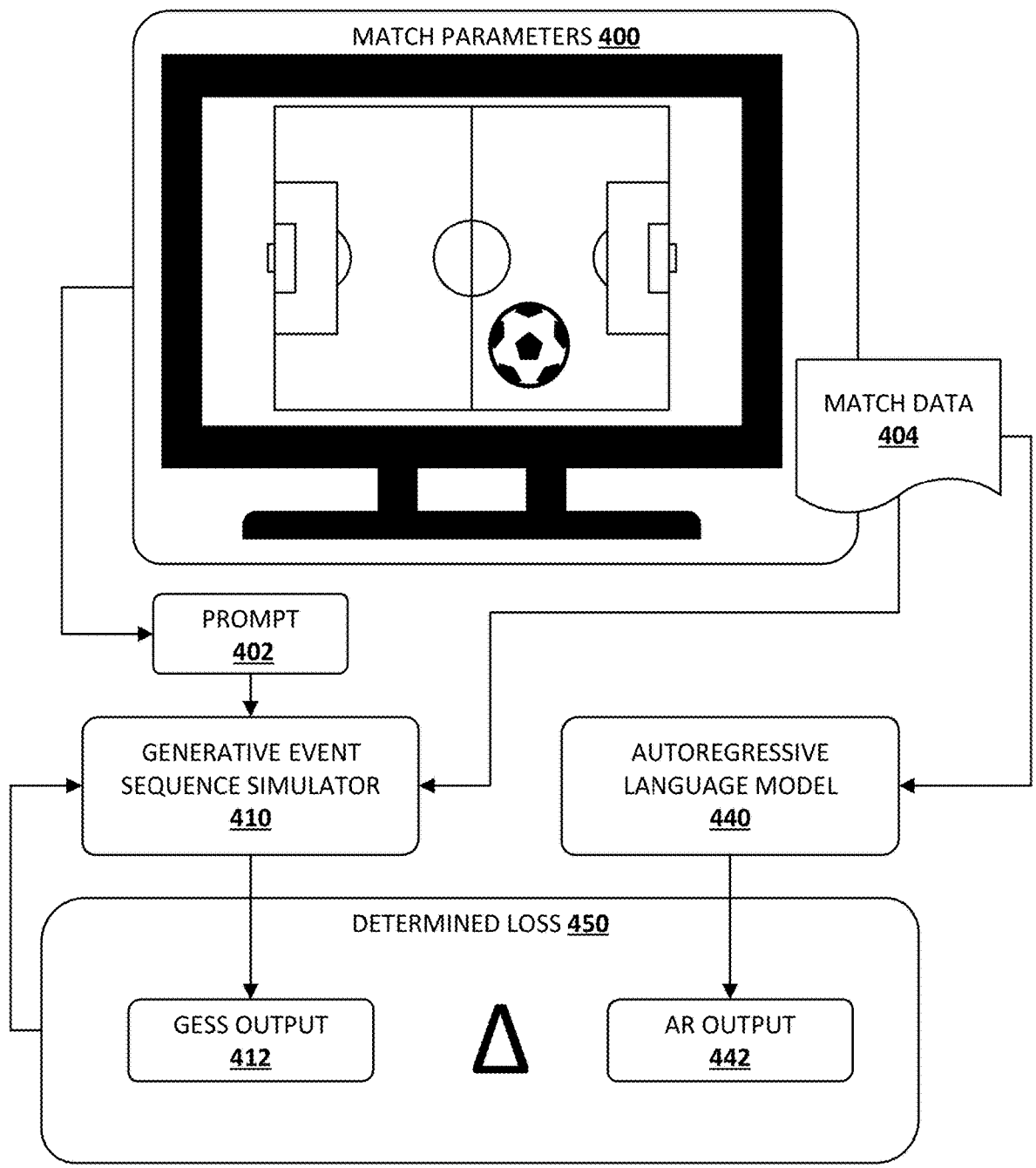
FIG. 4 depicts an example self-supervised training regime for a generative event sequence simulator, in accordance with one or more embodiments.

FIG. 4 depicts an example self-supervised training regime for a generative event sequence simulator (GESS) 410. The GESS 410 may be trained based on one or more matches, e.g., with pre-match dynamics represented by match parameters 400 (which may be any appropriate match parameters such as those previously described in reference to match 100 of FIG. 1). From the match, match data 404 may be generated, which may be any appropriate match data such as previously described in reference to match data 104 of FIG. 1. The GESS 410 may also operate on a prompt 402, which may be any appropriate prompt such as those previously described in reference to prompt 102 of FIG. 1. In some embodiments, during training, the GESS 410 may be prompted to generate 1 sequence of events, 1 subsequent event, a batch of sequences of events, a sequence of multiple events, etc. The type of events which the GESS 410 generates during training may be related to the model used for self-supervision.

In some embodiments, the GESS 410 may be trained on a set of supervised data, such as historical matches which may be divided into a first sequence of events known to the GESS 410 and a second sequence of events for the GESS 410 to be trained to predict. In some embodiments, self-supervision may be used additionally or instead, especially since generating training data for supervised training may be expensive, slow, and cumbersome. In some embodiments, for self-supervision, an autoregressive language model (AR) 440 may be used. The AR 440 may be trained to generate the next event in a sequence of events. The AR 440 may instead or additionally be any appropriate model trained to generate a sequence of events and/or events sequentially. The output of the GESS 410 (e.g., GESS output 412) and the AR 440 (e.g., AR output 442) may be compared to determine a loss 450, which may be used to train the GESS 410 through any appropriate method, such as gradient descent with backpropagation.

Optimization Techniques: In some embodiments, in order to stabilize the training process and prevent overfitting, optimization techniques, such as dropout and weight regularization, may be applied. These techniques may help the GESS model generalize to unseen event sequences and may enhance its ability to generate diverse and realistic matches. As selection of a good learning schedule may be important to successful training without overfitting, in some embodiments, the learning rate may be decayed, such as by a factor of 0.9, after multiple consecutive epochs (for example, after two consecutive epochs) with no improvement in the validation accuracy. In some embodiments, linear annealing and/or cosine annealing may be used. In other embodiments, annealing may be skipped, as it may not provide performance enhancement.

Temperature Parameter: In some embodiments, a temperature parameter (e.g., a hyperparameter) may be used to control stochasticity within the generative model. In some embodiments, the temperature parameter may be used during the generation or sampling phase of the GESS model. Higher temperature values (e.g., 1.0) may result in more diverse and random outputs, while lower temperature values (e.g., 0.5) may make the outputs more focused and deterministic. In some embodiments, lower temperature values may be used during training, and higher temperature values may be used during generation. In some embodiments, because the model is designed to generate multiple simulations of the same match, a temperature parameter which returns deterministic outputs is not desirable, nor is a temperature parameter which returns unrealistic results (e.g., hallucinations). For example, generating the same match 5000 times isn't helpful, hence the temperature needs to have high enough values to introduce some stochasticity, but additionally generating random and incoherent events isn't helpful, therefore the temperature should not be set at 1. In some embodiments, a temperature parameter of 0.9 may be used, which roughly corresponds to a sampling where 10% of the time, the most probable event is chosen, and 90% of the time an event is chosen by randomly sampling from the events of a probability distribution weighted by their probability, although other temperature parameters may be used. In some embodiments, on average, events of a predicted sequence will occur in quantities that match their respective probabilities, given that the previous events of the sequence have already occurred in a match.

Testing and Evaluation

In some embodiments, in order to evaluate the effectiveness of the generated matches, a testing process may be conducted. The evaluation may include both quantitative and qualitative measures:

Quantitative Evaluation: In some embodiments, statistical metrics, such as event distribution, conditional event distribution, etc., may be computed for matches (or other event sequences) generated by the GESS model. These metrics may then be compared against real-world match statistics to assess the realism and coherence of the generated matches. In an embodiment, for soccer matches, a pretrained GESS model produced results (e.g., match event sequences) which match the results (e.g., event distributions) of 250 different models trained to determine odds in 250 different matches (e.g., to price 250 different markets). This shows that the GESS model may be able to replace multiple models with a single trained instance of the GESS model—it has been shown that GESS is able to determine odds for 250 markets with a single model instead of 250. In some embodiments, the GESS may also be able to accurately determine multi-event odds, such as used to price a parlay, during matches (that is, on the fly for in-play betting and other applications). Many traditional techniques may require training of a specific model for each parlay or multi-event prediction. The replacement of multiple multi-event models with a single model represents a savings in computation time, potentially a savings in memory, and other technical improvements. Quantitatively, in some embodiments, the calibration curve of a GESS model was found to match that of individual models trained to calculate odds of a specific multi-event occurrence (e.g., to price a specific market).

Qualitative Evaluation: In some embodiments, expert opinions and user feedback may be collected to assess the entertainment value and coherence of the generated matches. Experts may evaluate the overall match dynamics, providing insights into the quality of the match generation process, such as realism, excitement, etc. In some embodiments, specifically for the soccer example described herein, their assessment noted that the GESS model may be able to simulate realistic soccer matches—as well as learning the style of each team based on their players and manager which may enhance realism. Experts also noted the GESS model may be capable of simulating rare events, such as teams scoring multiple goals at the end of the 2nd half to win the game. The GESS model may therefore be shown to provide realistic estimates about the likelihood of even low probability multiple event sequences.

In some embodiments, the architecture and training process outlined above may provide a robust foundation for generating full matches using the GESS model. The integration of positional embeddings, attention mechanisms, and transformer layers may enable the model to capture the intricacies of events, such as soccer matches, and produce realistic and engaging match sequences. In some embodiments, a subsequent evaluation process may ensure that the generated sequences of events (e.g., matches) exhibit the desired characteristics and may be utilized for various applications, such as training simulations and predictive analysis.

Additional Optimization

While the GESS model displays promising results, further improvement may be achieved through various optimization methods.

Avoiding Repetitive Patterns: In some embodiments, the GESS model may exhibit a tendency to generate repetitive patterns in event sequences, which may diminish the realism and diversity of the generated matches. Other techniques, such as stochastic noise injection, low-probability event forecasting, etc., which encourage the model to produce more varied and unpredictable match scenarios may be used in addition to those techniques described previously. Additionally or instead, in some embodiments, reinforcement learning from human feedback (RLHF) may be used to increase realism.

Incorporating Contextual Factors: In some embodiments, although the model may capture sequential dependencies within the event sequences, it may not fully consider contextual factors such as player form, injuries, and external conditions. Integrating additional information into the model, such as historical data and real-time match conditions, through the use of prompts, token encoded, etc. may enhance the accuracy and relevance of the generated matches.

Fine-tuning and Transfer Learning: In some embodiments, fine-tuning the GESS model, such as by using specific target leagues or teams, may improve the model's ability to generate matches that align with specific styles of play or team strategies. In some embodiments, transfer learning techniques may be used to leverage models pre-trained on general datasets and adapt them to specific scenarios or competitions.

Ethical Considerations: In some embodiments, because of general AI ethical and biasing concerns, ethical considerations may be explicitly considered, reviewed, checked, etc. In some embodiments, further rules may be applied to ensure that generated matches adhere to fair play principles, avoid promoting biased or discriminatory behaviors, and respect intellectual property rights when incorporating real-world player and team information.

Figure 5:
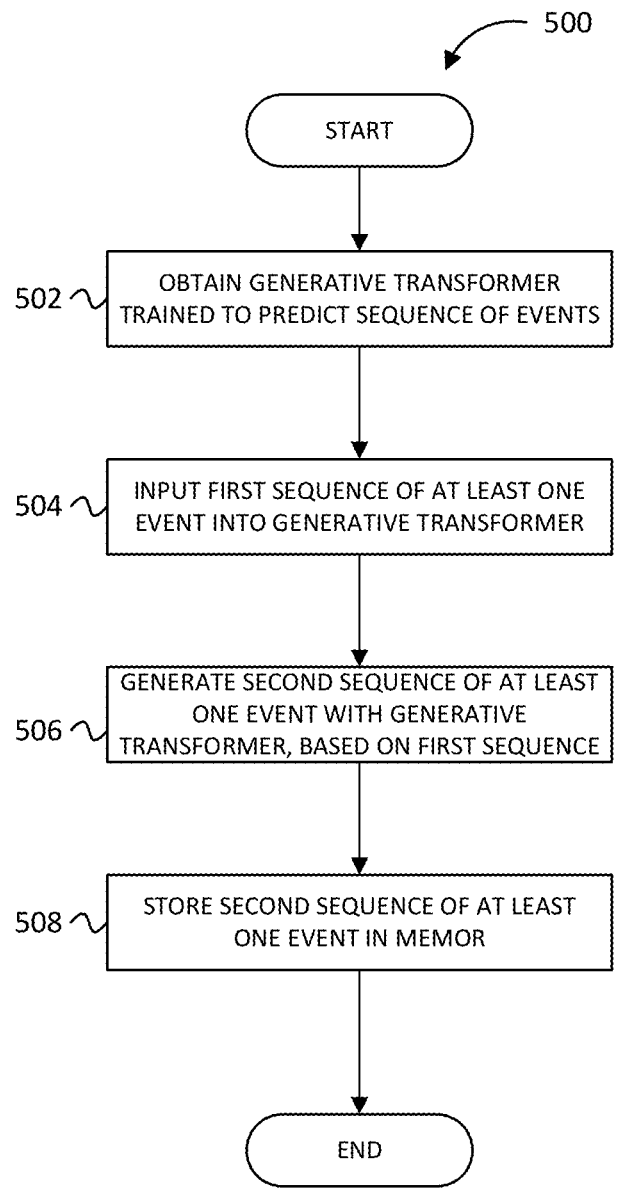
FIG. 5 is a flowchart illustrating an example method for event sequence generation by a generative event sequence simulator, in accordance with one or more embodiments.

FIG. 5 is a flowchart illustrating an example method 500 for event sequence generation by a generative event sequence simulator. According to an embodiment of the present disclosure, a predicted event sequence may be generated by a trained generative event sequence simulator. Each of these operations is described in detail below. The operations of method 500 presented below are intended to be illustrative. In some embodiments, method 500 may be accomplished with one or more additional operations not described, and/or without one or more of the operations discussed. Additionally, the order in which the operations of method 500 are illustrated in FIG. 5 and described below is not intended to be limiting. In some embodiments, one or more portions of method 500 may be implemented (e.g., by simulation, modeling, etc.) in one or more processing devices (e.g., one or more processors). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500, for example.

At an operation 502, a generative transformer trained to predict a sequence of events is obtained. The generative transformer may be obtained from storage. The generative transformer may be implemented by any appropriate processor, such as a specially designed processor capable of the parallelization necessary to operate the generative transformer. In some embodiments, the generative transformer may be the GESS model as described herein. The GESS model may be stored, including separately, as an architecture and a set of weights. In some embodiments, the weights may be fixed. In some embodiments, the weights may be floating. In some embodiments, the weights and/or architecture may have some element of stochasticity. The GESS may be trained to accept any appropriate input and output any appropriate sequence information, such as previously described.

At an operation 504, a first sequence of at least one event may be input into the generative transformer. The sequence may be input in any appropriate manner, including those previously described. The input may additionally or instead include a prompt. The prompt may be any appropriate prompt, such as those previously described. In some embodiments, the prompt may include the first sequence of at least one event. In some embodiments, the first sequence of at least one event may include pre-conditions for a sequence of events and no events which have occurred. For example, for a match which has not started, the first sequence of events may include information on match conditions, player conditions, pitch dimensions, altitude, etc. In some embodiments, the first sequence of at least one events may contain or be made substantially of null events, which may be information about positions (e.g., positional embeddings) for times which do not correspond to any specific events, events of a list of tracked events, etc.

At an operation 506, a second sequence of at least one event is generated by the generative transformer, based on the first sequence of at least one event. The second sequence may be generated by the generative transformer based on a prompt. In some embodiments, the second sequence of at least one event may be generated by the generative transformer based on both the first sequence of at least one event and a prompt. The stochasticity of the second sequence may depend on one or more hyperparameters of the generative transformer, such as the temperature parameter as previously described. In some embodiments, the generated transformer may generate multiple second sequences of at least one event, for example, 5000 possible second sequences of at least one event. In some embodiments, the generative transformer, or another program in communication with the generative transformer, may determine probabilities for various events of the second sequence, of the list of tracked events, etc.

At an operation 508, the second sequence of at least one event is stored in memory. The second sequence may be stored concatenated with the first sequence. In some embodiments, the second sequence may be stored independently. The second sequence may be stored in any appropriate format, such as text, numerical, token, etc.

As described above, method 500 (and/or the other methods described here) is configured for event sequence generation.

Figure 6:
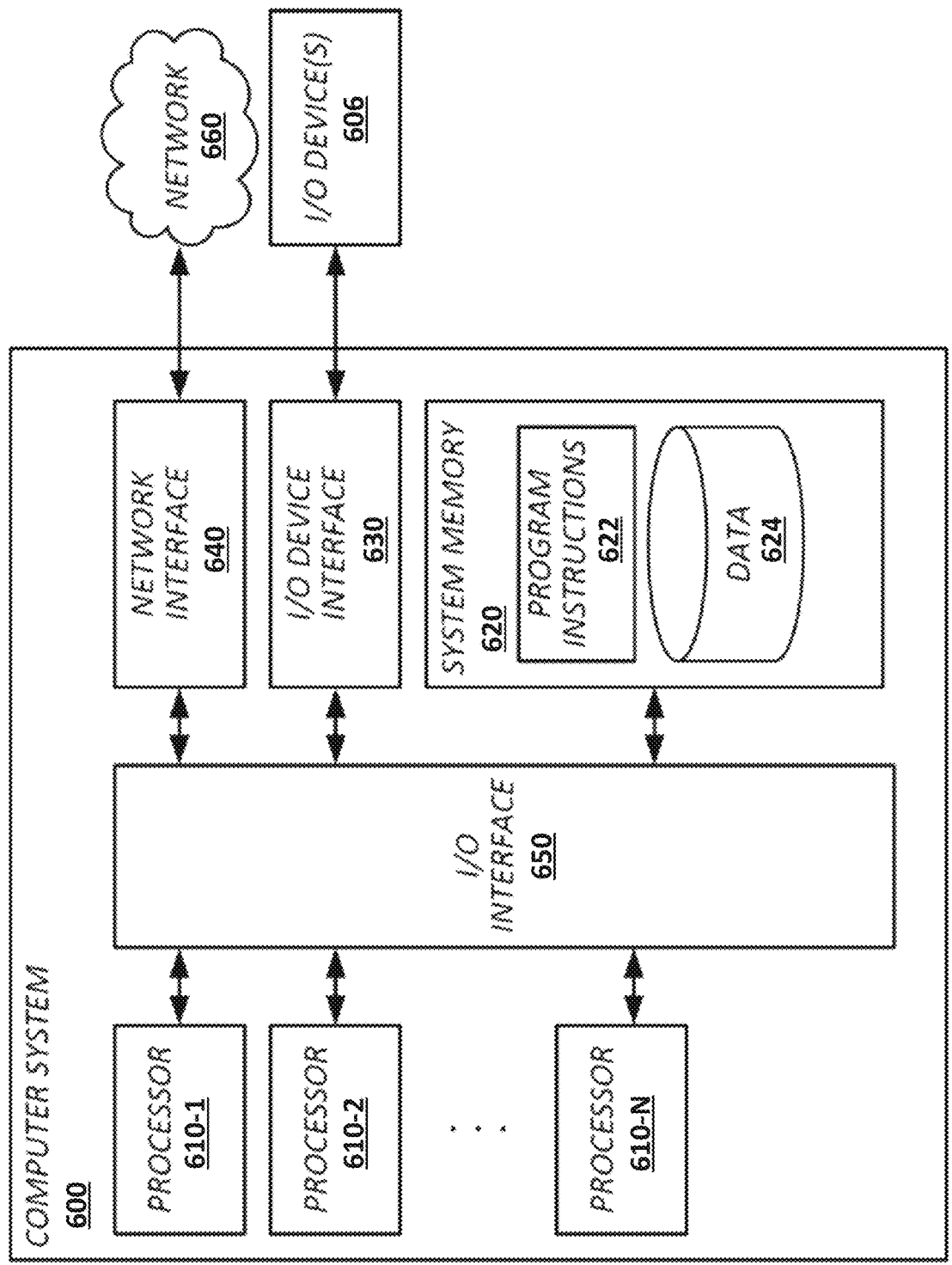
FIG. 6 illustrates an example computing system with which one or more embodiments may be implemented.

FIG. 6 is a diagram that illustrates an exemplary computing system 600 in accordance with embodiments of the present technique. Various portions of systems and methods described herein, may include or be executed on one or more computing systems similar to computing system 600. Further, processes and modules described herein may be executed by one or more processing systems similar to that of computing system 600.

Computing system 600 may include one or more processors (e.g., processors 610-1-610-N) coupled to system memory 620, an input/output (I/O) device 606 via an input/output (I/O) device interface 630, and a network 660 via a network interface 640 through an input/output (I/O) interface 650. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uniprocessor system including one processor (e.g., processor 610-1), or a multi-processor system including any number of suitable processors (e.g., 610-1-610-N). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 600 may include a plurality of computing devices (e.g., distributed computing systems) to implement various processing functions.

I/O devices may include devices that receive input (e.g., from a user) or output information (e.g., to a user). I/O devices 606 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 606 may be connected to computing system 600 through a wired or wireless connection. I/O devices 606 may be connected to computing system 600 from a remote location. I/O devices 606 located on remote computer systems, for example, may be connected to computing system 600 via a network, e.g., network(s) 660, and network interface 640.

Network interface 640 may include a network adapter that provides for connection of computing system 600 to a network. Network interface 640 may facilitate data exchange between computing system 600 and other devices connected to the network. Network interface 640 may support wired or wireless communication. The network, such as network(s) 660, may include an electronic communication network, such as the Internet, a local area network (LAN), a wide area network (WAN), a cellular communications network, or the like.

System memory 620 may be configured to store program instructions 622 or data 624. Program instructions 622 may be executable by a processor (e.g., one or more of processors 610-1-610-N) to implement one or more embodiments of the present techniques. Program instructions 622 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 620 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random-access memory (SRAM), synchronous dynamic RAM (SDRAM)), bulk storage memory (e.g., CD-ROM and/or DVD-ROM, hard-drives), or the like. System memory 620 may include a non-transitory computer readable storage medium that may have program instructions stored thereon that are executable by a computer processor (e.g., one or more of processors 610-1-610-N) to cause the subject matter and the functional operations described herein. A memory (e.g., system memory 620) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 650 may be configured to coordinate I/O traffic between processors 610-1-610-N, system memory 620, network interface 640, I/O devices 606, and/or other peripheral devices. I/O interface 650 may perform protocol, timing, or other data transformations to convert data signals from one component (e.g., system memory 620) into a format suitable for use by another component (e.g., processors 610-1-610-N). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 600 or multiple computing systems 600 configured to host different portions or instances of embodiments. Multiple computing systems 600 may provide for parallel or sequential processing/execution of one or more portions of the techniques described herein.

Those skilled in the art will appreciate that computing system 600 is merely illustrative and is not intended to limit the scope of the techniques described herein. Computing system 600 may include any combination of devices or software that may perform or otherwise provide for the performance of the techniques described herein. For example, computing system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 600 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system 600 may be transmitted to computing system 600 via transmission media or signals such as electrical, electromagnetic, or digital signals, conveyed via a communication medium such as a network or a wireless link. Various embodiments may further include receiving, sending, or storing instructions or data implemented in accordance with the foregoing description on a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine-readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to cost constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include," "including," and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square," "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1A. A tangible, non-transitory, machine-readable medium storing instructions that when executed by one or more processors effectuate operations comprising: obtaining, with a computing system, a generative transformer, the generative transformer trained to generate a predicted sequence of events; inputting, by the computer system, a first sequence of at least one event to the generative transformer; generating, with the generative transformer, a second sequence of at least one event subsequent to the first sequence of events based on the first sequence of at least one event; and storing, with the computer system, the second sequence of at least one event in memory.

2A. The medium of embodiment 1A, wherein inputting the first sequence of at least one event further comprises inputting at least one positional embedding for the first sequence of events, the positional embedding generated based on at least one physical location of an event, an actor in the event, or a game play object of the event of the first sequence.

3A. The medium of embodiment 2A, wherein the physical location is bounded by a game play space; wherein the physical location is normalized; wherein the positional embedding is a sinusoidal positional embedding; wherein the positional embedding is a concatenation of positional embeddings corresponding to multiple dimensions of the physical location; wherein the first sequence of at least one events is comprised of at least one event from a set of tracked events; and wherein the second sequence of at least one event is comprised of at least one event from the set of tracked events.

4A. The medium of embodiment 2A or 3A, wherein the generative transform is further trained to generate predicted physical locations for at least one of an event, an actor, or a game play object of the second sequence.

5A. The medium of any previous embodiment, wherein inputting the first sequence of at least one event comprises inputting multiple positional embeddings generated based on physical locations of one or more events, one or more actors, or a game play object, wherein some of the multiple positional embeddings correspond to the events of the first sequence.

6A. The medium of embodiment 5A, wherein the physical locations correspond to the physical locations of the one or more actors and the game play object; wherein the physical locations are bounded by a game play space; wherein the physical locations are normalized; wherein the positional embedding is a sinusoidal positional embedding; wherein the positional embedding is a concatenation of positional embeddings corresponding to multiple dimensions of the physical locations; wherein the first sequence of at least one events is comprised of at least one event from a set of tracked events; and wherein the second sequence of at least one event is comprised of at least one event from the set of tracked events.

7A. The medium of embodiment 5A or 6A, wherein some of the multiple positional embeddings do not correspond to events of the first sequence.

8A. The medium of any previous embodiment, wherein the generative transformer is pre trained to generate a sequence of events for a match.

9A. The medium of embodiment 8A, wherein the match is a contest between two or more teams, wherein each team comprises one or more actors, wherein the events correspond to a set of tracked events identified as possible occurrences in the match, and wherein at least some of the events comprise events corresponding to one or more actors.

10A. The medium of embodiment 8A or 9A, wherein the first sequence of at least one event comprises events which have already occurred in the match and wherein the second sequence of at least one even comprises a predicted sequence of events in the match.

11A. The medium of any previous embodiment, wherein inputting the first sequence to the generative transformer further comprises inputting a prompt to the generative transformer, wherein the generative transformer is further trained to generate the predicted sequence of events based on the prompt.

12A. The medium of embodiment 11A, wherein the prompt comprises information about one or more actors of the event.

13A. The medium of embodiment 11A or 12A, wherein the prompt and/or the first sequence of at least one event are tokenized as input embeddings and wherein the input embeddings are combined with positional embeddings corresponding to physical locations.

14A. The medium of any previous embodiment, wherein generating, with the generative transformer, a second sequence of at least one event subsequent to the first sequence of events comprises generating multiple alternative second sequences, each alternative second sequence of at least one event and each alternative second sequence subsequent to the first sequence of events.

15A. The medium of embodiment 14A, further comprising determining a probability for one or more events subsequent to the first sequence of events based on the multiple alternative second sequences.

16A. The medium of embodiment 14A or 15A, further comprising steps for determining a probability for a set of events subsequent to the first sequence of events based on the multiple alternative second sequences.

17A. The medium of any previous embodiment, further comprising steps for training the generative transformer to generate a predicted sequence of events.

18A. The medium of any previous embodiment, wherein the generative transformer is trained by self-supervision using an autoregressive language model to generate the predicted sequence of events.

19A. The medium of any previous embodiment, wherein the generative transformer generates the second sequence of at least one event based on a hyperparameter which injects stochasticity.

20A. A processor-mediated method comprising: obtaining, with a computing system, a generative transformer, the generative transformer trained to generate a predicted sequence of events; inputting, by the computer system, a first sequence of at least one event to the generative transformer; generating, with the generative transformer, a second sequence of at least one event subsequent to the first sequence of events based on the first sequence of at least one event; and storing, with the computer system, the second sequence of at least one event in memory.

1B. A tangible, non-transitory, machine-readable medium storing instructions that when executed by one or more processors effectuate operations comprising: obtaining, with a computing system, a generative artificial intelligence (AI) model, the generative AI model having been trained to output a predicted sequence of events; inputting, by the computer system, a first sequence of at least one event to the generative transformer AI model, the at least one event being associated with a positional encoding representing a physical location in a region of physical space at which the at least one event occurred; predicting, with the generative AI model, a second sequence of at least one event subsequent to the first sequence of at least one event based on the first sequence of at least one event and the positional encoding; and storing, with the computer system, the second sequence of at least one event in memory.

2B. The medium of any previous embodiment, wherein the positional encoding represents at least one spatial dimension of the physical location in the region of physical space with a vector having a plurality of scalars corresponding to a plurality of different frequencies of a periodic wave function.

3B. The medium of any previous embodiment, wherein the generative AI model is further trained to generate predicted physical locations in the region of physical space for at least one of an event, an actor, or an event object of the second sequence.

4B. The medium of any previous embodiment, wherein the positional encoding is a sinusoidal positional encoding; wherein the positional encoding is a concatenation of positional encoding corresponding to multiple dimensions of the physical location; wherein the first sequence of at least one events is comprised of at least one event from a set of tracked events; and wherein the region of physical space is bounded and predefined.

5B. The medium of any previous embodiment, wherein inputting the first sequence of at least one event comprises inputting multiple positional encodings for at least one event of the first sequence, the multiple positional encodings generated based on physical locations of multiple of one or more events, one or more actors, or an event object.

6B. The medium of any previous embodiment, wherein: the generative AI model is a transformer with multi-headed attention.

7B. The medium of any previous embodiment, wherein some of the events of the first sequence do not include positional encodings representing physical locations in the region of physical space.

8B. The medium of any previous embodiment, wherein the generative AI model is trained to predict events in a sporting match, weather events, crop yield events, crowd behavior events, forest fire events, crime events, material deformation or failure events, corrosion or oxidation events on metal surfaces, and maintenance events in industrial process equipment.

9B. The medium of any previous embodiment, wherein the generative AI model is a transformer trained to predict events in a match that is a contest between two or more teams, wherein each team comprises one or more actors, wherein predicted events correspond to a set of tracked events identified as possible occurrences in the match, and wherein at least some of the events comprise events corresponding to one or more actors.

10B. The medium of embodiment 9B, wherein the first sequence of at least one event comprises events which have already occurred in the match and wherein the second sequence of at least one even comprises a predicted sequence of events in the match, wherein the inputs also include descriptions of actor injuries.

11B. The medium of any previous embodiment, wherein: the generative AI model comprises a generative transformer; inputting the first sequence to the generative transformer further comprises inputting a prompt to the generative transformer; and the generative transformer is further trained to generate the predicted sequence of events based on the prompt.

12B. The medium of embodiment 11B, wherein the prompt comprises information about an actor causing at least one event, wherein the information is available before the at least one event caused by the actor causes the event.

13B. The medium of embodiment 11B, wherein the prompt and/or the first sequence of at least one event are tokenized as input embeddings and wherein the input embeddings are associated with a plurality of positional encodings corresponding to physical locations in the region of physical space.

14B. The medium of any previous embodiment, wherein the generative AI model is a non-deterministic model, and wherein predicting comprises predicting multiple sequences and determining population statistics based on the multiple sequences to estimate a likelihood of a specified event or class of events.

15B. The medium of any previous embodiment, further comprising steps for setting odds on an event occurring in a sporting match.

16B. The medium of any previous embodiment, further comprising steps for encoding physical location at which events occur in the region of physical space.

17B. The medium of any previous embodiment, further comprising steps for training the generative AI model.

18B. The medium of any previous embodiment, wherein the first sequence events are obtained by processing a video feed of at least part of the region of physical space with a computer vision model trained to detect at least some of the first sequence of events.

19B. The medium of any previous embodiment, wherein: the generative AI model is nondeterministic; the generative AI model is configured to determine, based on the prediction, joint probabilities of a set of a plurality of events occurring.

20B. The medium of any previous embodiment, the operations comprising: detecting, based on the prediction, that an anomalous event has occurred; and causing an alert to be presented characterizing the anomalous event.

21B. The medium of any previous embodiment, wherein the at least one event is associated with an additional positional encoding representing a position of the event in the first sequence and predicting the second sequence comprises predicting the second sequence of at least one event subsequent to the first sequence of at least one event based on the first sequence of at least one event, the positional encoding, and the additional positional encoding.

22B. A processor-mediated method comprising: obtaining, with a computing system, a generative artificial intelligence (AI) model, the generative AI model having been trained to output a predicted sequence of events in response to receiving predicate events, wherein the predicted sequence of events are not natural language text tokens, and the events are part of an at least partially stochastic process that occurs over a region of physical space; inputting, by the computer system, a first sequence of at least one event to the generative AI model, the at least one event being associated with a positional encoding representing a physical location in the region of physical space at which the at least one event occurred; predicting, with the generative AI model, a second sequence of at least one event subsequent to the first sequence of events based on the first sequence of at least one event and the positional encoding; and storing, with the computer system, the second sequence of at least one event in memory.

What is claimed is:

1. A non-transitory machine-readable medium storing instructions that when executed by one or more processors effectuate operations comprising:
   obtaining, with a computing system, a generative artificial intelligence (AI) model, the generative AI model having been trained to output a predicted sequence of events;
   inputting, by the computer system, a first sequence of at least one event to the generative AI model, the at least one event being associated with a positional encoding representing a physical location in a region of physical space at which the at least one event occurred;
   predicting, with the generative AI model, a second sequence of at least one event subsequent to the first sequence of at least one event based on the first sequence of at least one event and the positional encoding; and
   storing, with the computer system, the second sequence of at least one event in memory.

2. The medium of claim 1, wherein the positional encoding represents at least one spatial dimension of the physical location in the region of physical space with a vector having a plurality of scalars corresponding to a plurality of different frequencies of a periodic wave function.

3. The medium of claim 2, wherein the generative AI model is further trained to generate predicted physical locations in the region of physical space for at least one of an event, an actor, or an event object of the second sequence.

4. The medium of claim 1, wherein the positional encoding is a sinusoidal positional encoding; wherein the positional encoding is a concatenation of positional encoding corresponding to multiple dimensions of the physical location; wherein the first sequence of at least one events is comprised of at least one event from a set of tracked events; and wherein the region of physical space is bounded and predefined.

5. The medium of claim 1, wherein inputting the first sequence of at least one event comprises inputting multiple positional encodings for at least one event of the first sequence, the multiple positional encodings generated based on physical locations of multiple of one or more events, one or more actors, or an event object.

6. The medium of claim 1, wherein:
   the generative AI model is a transformer with multi-headed attention.

7. The medium of claim 1, wherein some of the events of the first sequence do not include positional encodings representing physical locations in the region of physical space.

8. The medium of claim 1, wherein the generative AI model is trained to predict events in a sporting match, weather events, crop yield events, crowd behavior events, forest fire events, crime events, material deformation or failure events, corrosion or oxidation events on metal surfaces, and maintenance events in industrial process equipment.

9. The medium of claim 1, wherein the generative AI model is a transformer trained to predict events in a match that is a contest between two or more teams, wherein each team comprises one or more actors, wherein predicted events correspond to a set of tracked events identified as possible occurrences in the match, and wherein at least some of the events comprise events corresponding to one or more actors.

10. The medium of claim 9, wherein the first sequence of at least one event comprises events which have already occurred in the match and wherein the second sequence of at least one even comprises a predicted sequence of events in the match, wherein the inputs also include descriptions of actor injuries.

11. The medium of claim 1, wherein:
   the generative AI model comprises a generative transformer;
   inputting the first sequence to the generative transformer further comprises inputting a prompt to the generative transformer; and
   the generative transformer is further trained to generate the predicted sequence of events based on the prompt.

12. The medium of claim 11, wherein the prompt comprises information about an actor causing at least one event, wherein the information is available before the at least one event caused by the actor causes the event.

13. The medium of claim 11, wherein the prompt and/or the first sequence of at least one event are tokenized as input embeddings and wherein the input embeddings are associated with a plurality of positional encodings corresponding to physical locations in the region of physical space.

14. The medium of claim 1, wherein the generative AI model is a non-deterministic model, and wherein predicting comprises predicting multiple sequences and determining population statistics based on the multiple sequences to estimate a likelihood of a specified event or class of events.

15. The medium of claim 1, further comprising steps for setting odds on an event occurring in a sporting match.

16. The medium of claim 1, further comprising steps for encoding physical location at which events occur in the region of physical space.

17. The medium of claim 1, further comprising steps for training the generative AI model.

18. The medium of claim 1, wherein the first sequence events are obtained by processing a video feed of at least part of the region of physical space with a computer vision model trained to detect at least some of the first sequence of events.

19. The medium of claim 1, wherein:
the generative AI model is nondeterministic;
the generative AI model is configured to determine, based on the prediction, joint probabilities of a set of a plurality of events occurring.

20. The medium of claim 1, the operations comprising:
detecting, based on the prediction, that an anomalous event has occurred; and
causing an alert to be presented characterizing the anomalous event.

21. The medium of claim 1, wherein the at least one event is associated with an additional positional encoding representing a position of the event in the first sequence and predicting the second sequence comprises predicting the second sequence of at least one event subsequent to the first sequence of at least one event based on the first sequence of at least one event, the positional encoding, and the additional positional encoding.

22. A processor-mediated method comprising:
obtaining, with a computing system, a generative artificial intelligence (AI) model, the generative AI model having been trained to output a predicted sequence of events in response to receiving predicate events, wherein the predicted sequence of events are not natural language text tokens, and the events are part of an at least partially stochastic process that occurs over a region of physical space;
inputting, by the computer system, a first sequence of at least one event to the generative AI model, the at least one event being associated with a positional encoding representing a physical location in the region of physical space at which the at least one event occurred;
predicting, with the generative AI model, a second sequence of at least one event subsequent to the first sequence of events based on the first sequence of at least one event and the positional encoding; and
storing, with the computer system, the second sequence of at least one event in memory.

23. The method of claim 22, wherein the positional encoding represents at least one spatial dimension of the physical location in the region of physical space with a vector having a plurality of scalars corresponding to a plurality of different frequencies of a periodic wave function.

24. The method of claim 23, wherein the generative AI model is further trained to generate predicted physical locations in the region of physical space for at least one of an event, an actor, or an event object of the second sequence.

25. The method of claim 22, wherein the positional encoding is a sinusoidal positional encoding; wherein the positional encoding is a concatenation of positional encoding corresponding to multiple dimensions of the physical location; wherein the first sequence of at least one events is comprised of at least one event from a set of tracked events; and wherein the region of physical space is bounded and predefined.

26. The method of claim 22, wherein inputting the first sequence of at least one event comprises inputting multiple positional encodings for at least one event of the first sequence, the multiple positional encodings generated based on physical locations of multiple of one or more events, one or more actors, or an event object.

27. The method of claim 22, wherein:
the generative AI model is a transformer with multi-headed attention.

28. The method of claim 22, wherein some of the events of the first sequence do not include positional encodings representing physical locations in the region of physical space.

29. The method of claim 22, wherein the generative AI model is trained to predict events in a sporting match, weather events, crop yield events, crowd behavior events, forest fire events, crime events, material deformation or failure events, corrosion or oxidation events on metal surfaces, and maintenance events in industrial process equipment.

30. The method of claim 22, wherein the generative AI model is a transformer trained to predict events in a match that is a contest between two or more teams, wherein each team comprises one or more actors, wherein predicted events correspond to a set of tracked events identified as possible occurrences in the match, and wherein at least some of the events comprise events corresponding to one or more actors.

31. The method of claim 30, wherein the first sequence of at least one event comprises events which have already occurred in the match and wherein the second sequence of at least one even comprises a predicted sequence of events in the match, wherein the inputs also include descriptions of actor injuries.

32. The method of claim 22, wherein:
the generative AI model comprises a generative transformer;
inputting the first sequence to the generative transformer further comprises inputting a prompt to the generative transformer; and
the generative transformer is further trained to generate the predicted sequence of events based on the prompt.

33. The method of claim 32, wherein the prompt comprises information about an actor causing at least one event, wherein the information is available before the at least one event caused by the actor causes the event.

34. The method of claim 32, wherein the prompt and/or the first sequence of at least one event are tokenized as input embeddings and wherein the input embeddings are associated with a plurality of positional encodings corresponding to physical locations in the region of physical space.

35. The method of claim 22, wherein the generative AI model is a non- deterministic model, and wherein predicting comprises predicting multiple sequences and determining population statistics based on the multiple sequences to estimate a likelihood of a specified event or class of events.

36. The method of claim 22, further comprising steps for setting odds on an event occurring in a sporting match.

37. The method of claim 22, further comprising steps for encoding physical location at which events occur in the region of physical space.

38. The method of claim 22, further comprising steps for training the generative AI model.

39. The method of claim 22, wherein the first sequence events are obtained by processing a video feed of at least part of the region of physical space with a computer vision model trained to detect at least some of the first sequence of events.

40. The method of claim 22, wherein:
the generative AI model is nondeterministic;
the generative AI model is configured to determine, based on the prediction, joint probabilities of a set of a plurality of events occurring.

41. The method of claim 22, further comprising:
detecting, based on the prediction, that an anomalous event has occurred; and causing an alert to be presented characterizing the anomalous event.

42. The method of claim 22, wherein the at least one event is associated with an additional positional encoding representing a position of the event in the first sequence and predicting the second sequence comprises predicting the second sequence of at least one event subsequent to the first sequence of at least one event based on the first sequence of at least one event, the positional encoding, and the additional positional encoding.

* * * * *